United States Patent [19]

Takano

[11] 3,922,500

[45] Nov. 25, 1975

[54] PUSHBUTTON DIALING SYSTEM

[75] Inventor: Toshiichi Takano, Mitaka, Japan

[73] Assignee: Iwatsu Electric Co., Ltd., Tokyo, Japan

[22] Filed: Apr. 17, 1974

[21] Appl. No.: 461,746

[30] Foreign Application Priority Data

June 4, 1973 Japan ............................... 48-62806

[52] U.S. Cl. ............................................. 179/84 VF

[51] Int. Cl.² ............................................. H04M 1/50

[58] Field of Search ......... 179/84 R, 84 VF, 18 HB, 179/16 A, 16 AA, 16 D

[56] References Cited

UNITED STATES PATENTS

| | | | |
|---|---|---|---|
| 2,971,062 | 2/1961 | Salihi | 179/84 VF |
| 3,200,205 | 8/1965 | Herter | 179/84 VF |
| 3,454,726 | 7/1969 | Gasser | 179/84 VF |
| 3,636,269 | 1/1972 | Edstrom | 179/84 VF |

*Primary Examiner*—William C. Cooper
*Assistant Examiner*—Joseph Popek
*Attorney, Agent, or Firm*—Oblon, Fisher, Spivak, McClelland & Maier

[57] ABSTRACT

A push-button dialing system for sending multifrequency signals of a dialed signal, in which a gate circuit is provided between an MF receiver of a telephone central office of P.B.X. and a signal transmitter for sending the multifrequency signals of a dial signal when a subscriber depresses a push-button of a telephone set. The signal transmitter includes a switch activated in connection with the depression of the push-button. The gate circuit in the telephone central office or P.B.X. assumes an on-state when the gate circuit receives in response to the switching on of the switch a signal transmitted over a control line extending between the switch and the gate circuit, whereby the MF receiver can receive MF signals sent from the signal transmitter only when the subscriber dials.

14 Claims, 4 Drawing Figures

PUSHBUTTON DIALING SYSTEM

BACKGROUND OF THE INVENTION

1. Field of the Invention

This invention relates in general to a signaling system and more particularly to a push-button dialing system in which information may be transmitted in the form of bursts of predetermined voice frequencies.

2. Description of the Prior Art

In the past, one problem in designing a voice frequency signaling system was to discriminate between valid signals and noise or speech energy appearing on the line.

Heretofore, several proposals have been made in an attempt to settle the above-mentioned problem. For example, a conventional push-button dialing system comprises a signal transmitter designed to generate two frequencies, each of which is within the voice spectrum. These two frequencies are identified for convenience as the A(about 250–800Hz) and B(about 800–1, 400Hz) band frequencies which are generally called the first and second Format respectively. A signal receiver in a telephone central office comprises a pair of band elimination filters which separate and eliminate the B and A bands, respectively.

The band elimination filters are coupled to limiters which respectively limit the amplitude of the signal. The limiters are connected to a plurality of selective circuits or filters which pass the individual signaling frequencies and reject all others. The selective circuits are all connected to respective registering devices which may utilize a relay for each circuit operated in the presence of the particular resonant frequency of the filter circuit.

Further, in order to enhance the reliability there has been proposed another multifrequency signaling system including an amplifier which amplifies the C (about 2,500–3,000Hz) band frequencies called the third Formant which are within the voice spectrum and a timer circuit provided in the selective circuit in addition to the circuit elements of the above-mentioned push-button dialing system.

Accordingly, if speech sound or noise appears on the line when a subscriber lifts a handset and dials, the amplifier will amplify the C band of the speech sound or noise. As a result thereof the amount of frequencies of the A and B bands to the C band will be relatively reduced so that the selective circuits may not operate.

However, both of said push-button dialing systems substantially permit the speech sound or noise to enter an input side of the signal receiver. Accordingly, the conventional signaling system has a possibility that an operation error of the signal receiver may occur. Moreover with the amplifier for the C band and the timer circuit being provided with the signaling system in order to enhance the reliability, the circuit for the system becomes complicated and expensive.

SUMMARY OF THE INVENTION

It is therefore a general object of this invention to enhance the reliability of a multifrequency signaling system.

It is another object of this invention to obtain reliability in a system of comparative simplicity and low cost so that it may be practically utilized in a multifrequency signal receiver for a push-button dialing system.

Briefly, in accordance with this invention the foregoing and other objects are in one aspect obtained by the provision of a gate circuit between an MF receiver of a telephone central office of P.B.X. and a signal transmitter for sending multifrequency signals of a dialed signal when a subscriber depresses a push-button of a telephone set. The signal transmitter includes a switch actuated in connection with the depression of the push-button. The gate circuit in the telephone central office or P.B.X. assumes the on-state when the gate circuit receives a signal transmitted over a control line extending between the switch and the gate circuit, in response to the switching on of the switch whereby the MF receiver can receive MF signals sent from the signal transmitter only when the subscriber dials.

BRIEF DESCRIPTION OF THE DRAWINGS

The above and other objects and features of this invention may be more fully comprehended from the following detailed description when considered with reference to the accompanying drawings which shows an illustrative preferred embodiment of the present invention, in which like reference characters designate the same or similar parts throughout the figures thereof and wherein.

DETAILED DESCRIPTION OF THE PREFERRED EMBODIMENTS

Figure 1:
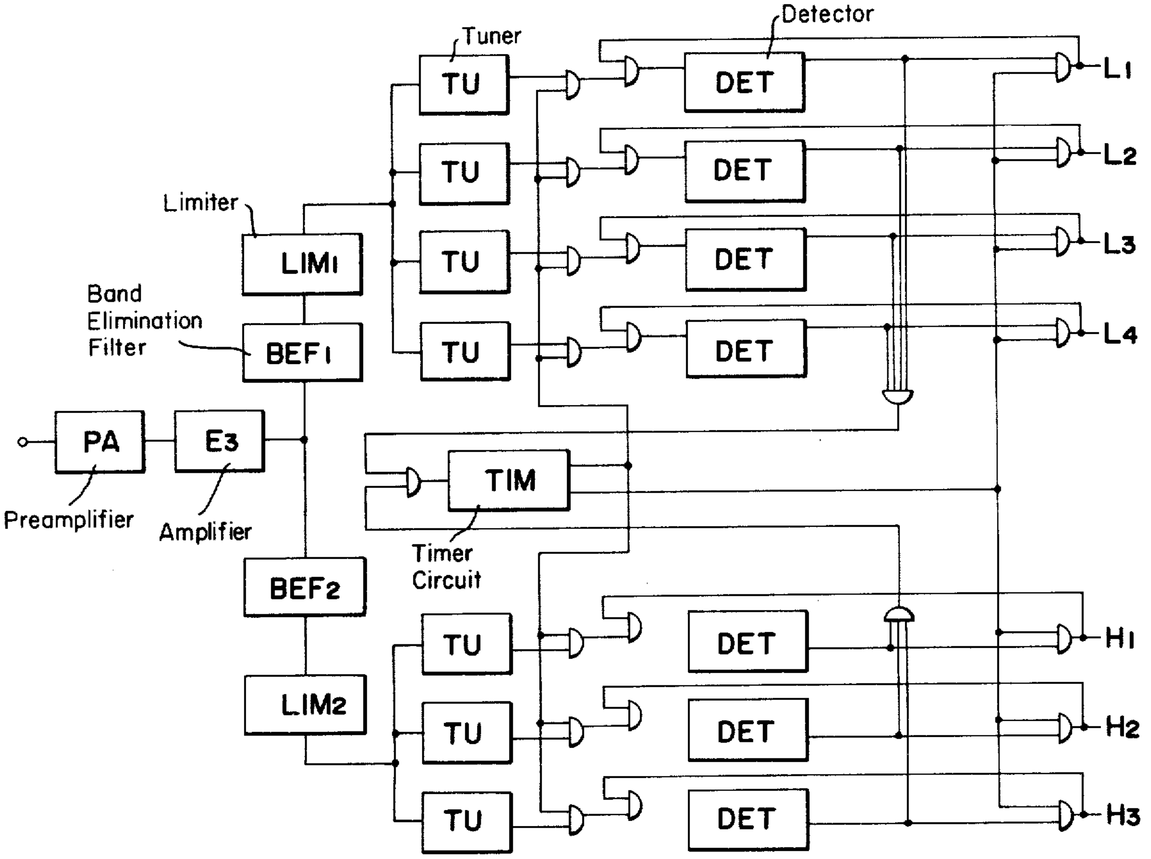
FIG. 1 is a block diagram showing a conventional MF signal receiver for a push-button dialing system in a telephone central office or P.B.X.

Referring now to the drawings and more particularly to FIG. 1, a conventional signal receiver is shown as including a preamplifier PA, an amplifier E3 for amplifying the C band of speech sound, a pair of band elimination filters $BEF_1$ and $BEF_2$, limiters L1 M1 and L1 M2, a plurality of selective circuits or tuners TU, detectors DET and a timer circuit TIM. L1–L4 and H1–H3 refer to an output of the signal receiver respectively.

Figure 2:
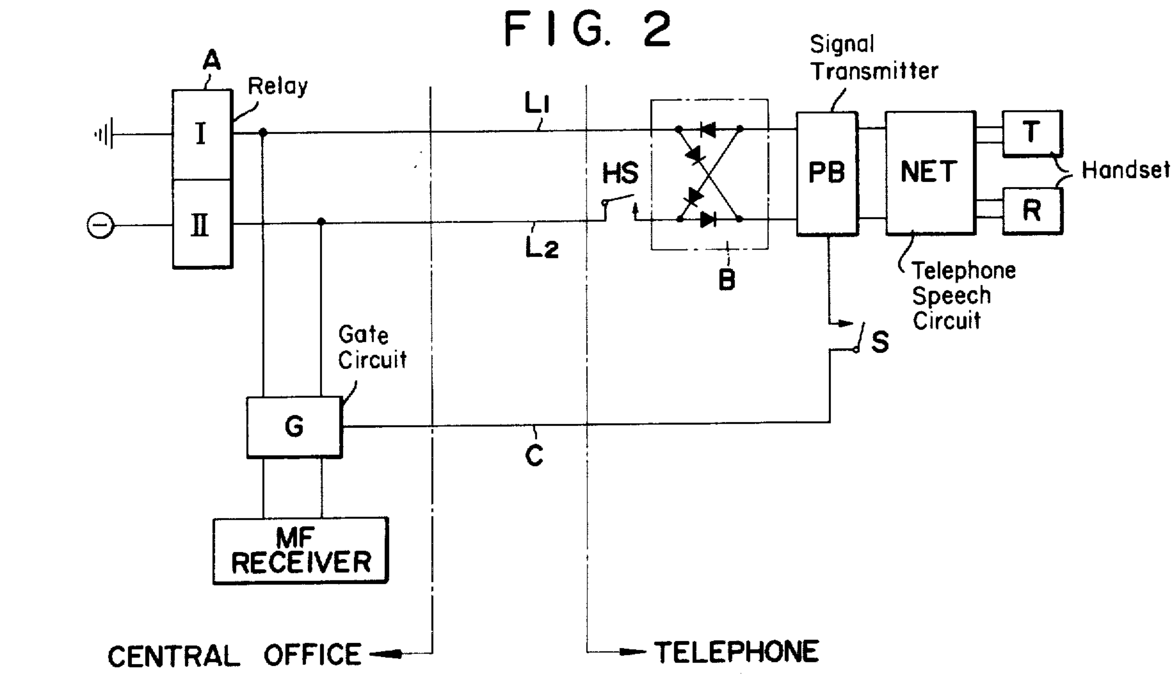
FIG. 2 is a schematic diagram of a circuit for a push-button dialing system according to the present invention.

Referring now to the drawing in FIG. 2, a preferred embodiment of a push-button dialing system of this invention may be seen as comprising a relay A for supplying a speech current, speech lines L1 and L2, a signal transmitter PB including controls, preferably having push-button-actuated contacts, for connecting oscillators for transmission of oscillatory waves over the lines L1 and L2 to the signal receiver of a telephone central office or P.B.X., a switch S actuated in connection with the operation of the push-button of the telephone set when a subscriber dials, a telephone speech circuit NET, handsets T and R, a gate circuit G which assumes an on-state or an off-state in response to the operation of the switch S, a control line C for transmitting a signal in response to the on-off operation of the switch S to the gate circuit G, and a multifrequency signal receiver MF.

The operation of this invention will be explained as follows referring to FIG. 2. When a subscriber desires to place a call over an out going line, he first lifts his handset from its cradle which effects closure of a switchhook HS in a well-known manner. Accordingly a direct current path is established. The relay A is then energized and the signal transmitter PB is set in a condition so that the subscriber may dial. When the push-button of the telephone set is then depressed the switch S operates to close its contact. The gate circuit G assumes an on-state as soon as a path including ground-the relay A-the speech line L1-the rectifier B-the signal transmitter PB-the gate circuit G is established. The gate circuit normally assumes an off-state, but it will turn to an on-state when the above-mentioned path is established. Accordingly, when the gate circuit turns to an on-state, the MF receiver will receive multifrequency signals of the dial signal from the signal transmitter over the lines L1 and L2 and thereby accomplish a predetermined operation. On the other hand, when a subscriber releases the push-button, the switch S will restore so that the gate circuit turns to an off-state because the gate circuit is disconnected from the ground of the above-mentioned path.

Figures 3, 4:
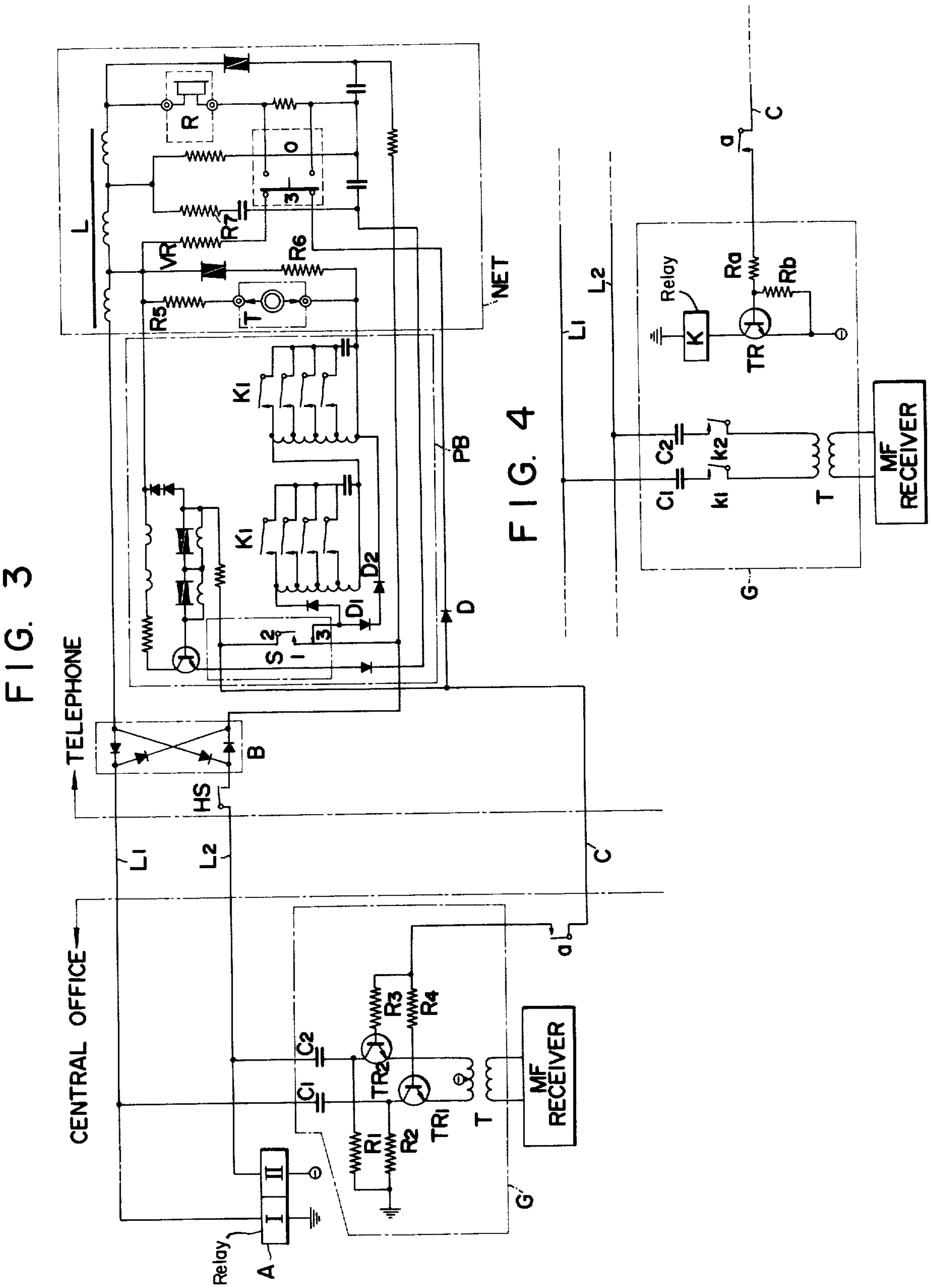
FIG. 3 is a circuit of an illustrative preferred embodiment of a push-button dialing system as shown in FIG. 2; and, FIG. 4 is a partial view of a push-button-dialing system as shown in FIG. 2.

FIG. 3 shows in detail the preferred embodiment of this invention for more fully understanding the operation thereof. In FIG. 3, when a subscriber lifts the handset from the cradle, a direct current path is established that is: ground—a first winding I of the relay—the speech line $L_1$—a rectifier B—a contact 1 of the switch S—a contact 3—a diode $D_1$—a diode $D_2$ < a handset T — a resistor $R_5$ / a resistor $R_6$— a varistor VR > coil L— the rectifier B the switch-hook HS—the speech line $L_2$—a second winding II of the relay A—a D.C. electric source⊖ applying a negative voltage.

As a result thereof the relay A operates so as to close its contact *a*. In this phase a transistor $TR_1$ and a transistor $TR_2$ in the gate circuit G assume an off-state respectively because ground is not connected to the bases of the transistor $TR_1$ and the transistor $TR_2$, since a contact of the switch S is opened. As a result speech sound or noise transmitted over the lines $L_1$ and $L_2$ do not appear on a transformer T which sends valid signals from the signal transmitter PB to the MF signal receiver.

When the subscriber depresses the push-buttons of the telephone set in order to place a call, contacts 1 and 2 of the switch S operate so as to make, that is be in an on-state. At the same time contacts 1 and 3 of the switch operate so as to break, that is in an off-state. Accordingly, a path of the ground—the first winding I of the relay A—the speech line $L_1$—the rectifier B—the contacts 1 and 2 of the switch S—the control line C—a contact a closed by an operation of the relay A is established.

As a result thereof the transistor $TR_1$ and the transistor $TR_2$ in the gate circuit G assume an on-state respectively because ground is connected to the bases of the transistor $TR_1$ and the transistor $TR_2$ respectively by way of the contact a—

< a resistor $R_3$— a base-and emitter path of the transistor $TR_2$— the transformer T / a resistor $R_4$— a base-and emitter path of the transistor $TR_1$— the transformer T > D.C. electric source⊖ applying a negative voltage.

In this phase as the transistors $TR_1$ and $TR_2$ assume an on-state respectively, they permit an electric current to flow through a resistor $R_1$ and a resistor $R_2$ respectively. At the same time the MF signal receiver receives valid signals of multifrequencies from the signal transmitter PB over the lines $L_1$ and $L_2$ through the transformer T. The MF signal receiver receives the MF signal and then accomplishes the predetermined operation.

When the subscriber releases the push-button of the telephone set, the contacts 1 and 2 of the switch S restore. As a result thereof the transistors $TR_1$ and $TR_2$ turn off because the bases of the transistors $TR_1$ and $TR_2$ are respectively disconnected from ground and an input to the MF signal receiver is terminated. A capacitor $C_1$ connected between the line $L_1$ and a collector of the transistor $TR_1$ and a capacitor $C_2$ connected between the line $L_2$ and a collector of the transistor $TR_2$ are provided in the gate circuit G so that ground from the relay A and a voltage of D.C. voltage source⊖ may not be applied to the transistors $TR_1$ and $TR_2$ respectively. The contact of the relay A existing between a common connecting point of the resistors $R_3$ and $R_4$ and the contact 2 of the switch S is provided in the telephone central office so that ground may not be applied to the gate circuit G over the control line C when the subscriber depresses the push-button of the telephone set in spite of his not lifting the handset from the cradle, since the switch-hook HS is normally connected to the D.C. voltage source⊖.

A diode D is provided between the contact a and the telephone speech circuit NET so that ground may not be applied to the gate circuit over the control line C by way of the following path notwithstanding the subscriber not depressing the push-button after he has lifted the handsets T and R from the cradle, that is the path of ground—the first winding I of the relay A—the speech line $L_1$—the rectifier B—the contacts 1 and 3 of the switch S—the diode $D_1$—the diode $D_2$—

< the handset T— the resistor $R_5$ / the resistor $R_6$— the varistor VR > a resistor $R_7$ — the diode D.

FIG. 4 shows another alternative embodiment of the gate circuit G. In FIG. 4 when a subscriber depresses the push-button of the telephone set in order to place a call, ground transmitted over the control line C through the contact a causes a transistor TR to assume the on-state by way of the path of a resistor Ra < the transistor TR / the resistor Rb > D.C. voltage source⊖ applying applying a negative voltage and then a relay K is energized. At the same time contacts $k_1$ and $k_2$ of the relay K operate so as to close. As a result thereof a valid signal is sent to the MF receiver through the transformer over the lines $L_1$ and $L_2$ during dialing after the subscriber has lifted the handset from the cradle.

It is to be understood that the above-described arrangements are illustrative of the application of the principles of the invention. Numerous other arrangements may be devised by those skilled in the art without departing from the spirit and scope of the invention.

What is claimed as new and desired to be secured by Letters Patent of the United States is:

1. A push-button dialing system for sending multifrequency signals from a telephone set comprising:

a signal transmitter for sending said multifrequency signals over speech lines, switching means actuated only in response to the depression of a push-button on the signal transmitter and deactuated in response to release of the push-button, a signal receiver for receiving said multifrequency signals over said speech lines, a gate circuit connected between the speech lines and the signal receiver and actuated by the actuation of said switching means to permit the signal receiver to receive the signals transmitted over the speech lines, and a control line connected between the switching means and a control electrode of the gate circuit for sending a signal to the gate circuit in response to the actuation of said switching means so that said signal receiver can receive said multifrequency signals sent from said signal transmitter over the speech lines only when a subscriber depresses push-buttons on a telephone set.

2. A push-button dialing system according to claim 1 wherein said gate circuit is provided in a telephone central office or P.B.X.

3. A push-button dialing system according to claim 1 wherein said signal transmitter comprises push-button-actuated contacts for connecting oscillators for transmission of oscillatory waves over speech lines to the signal receiver.

4. A push-button dialing system for sending multifrequency signals from a telephone set comprising:

a signal transmitter for sending said multifrequency signals over speech lines, first switching means actuated only in response to the depression of a push-button on the signal transmitter and deactuated in response to release of the push-button, a signal receiver for receiving said multifrequency signals over said speech lines, a gate circuit connected between the speech lines and the signal receiver and actuated by the actuation of said first switching means to permit the signal receiver to receive the signals transmitted over the speech lines, a control line connected between the first switching means and a control electrode of the gate circuit for sending a signal to the gate circuit in response to the actuation of said first switching means, and second switching means provided between said first switching means and said gate circuit actuated when a telephone handset is removed from its base by a subscriber so that said signal receiver can receive said multifrequency signals sent from said signal transmitter over the speech lines only when a subscriber despresses push-buttons on a telephone set.

5. A push-button dialing system according to claim 4 wherein said signal receiver and said second switching means are provided in a telephone central office or P.B.X.

6. A push-button dialing system according to claim 4 wherein said signal transmitter comprises push-button-actuated contacts for connecting an oscillator for transmission of oscillatory waves over speech lines to the signal receiver.

7. A push-button dialing system according to claim 1 wherein said gate circuit comprises a first transistor having its collector to emitter path connected between a first speech line and the signal receiver and a second transistor having its collector to emitter path connected between a second speech line and the signal receiver, the bases of said first and second transistors being connected to said switching means so that said first and second transistors are actuated only when said switching means is actuated.

8. A push-button dialing system according to claim 4 wherein said gate circuit comprises a first transistor having its collector to emitter path connected between a first speech line and the signal receiver and a second transistor having its collector to emitter path connected between a second speech line and the signal receiver, the bases of said first and second transistors being connected to said first and second switching means so that said first and second transistors are actuated only when said first switching means and said second switching means are actuated.

9. A push-button dialing system according to claim 7 wherein said gate circuit comprises a first and a second capacitor connected between the collector to emitter path of said first and second transistors and the first and second speech lines respectively.

10. A push-button dialing system according to claim 8 wherein said gate circuit comprises a first and a second capacitor connected to the collectors of said first and second transistors respectively.

11. A push-button dialing system according to claim 1 wherein said gate circuit comprises a transistor connected to said switching means by said control line, and a second switching means connected between the speech lines and the signal receiver and energized by actuation of said transistor.

12. A push-button dialing system according to claim 4, wherein said gate circuit comprises a transistor connected to said first and second switching means by said control line, and a third switching means connected between the speech lines and the signal receiver and energized by actuation of said transistor.

13. A push-button dialing system according to claim 11 wherein said second switching means comprises a relay connected between the collector to emitter path of said transistor and a reference potential, and contact members including a first contact and a second contact connected between the speech lines and the signal receiver and actuated in response to actuation of said relay.

14. A push-button dialing system according to claim 13 wherein said gate circuit comprises a first capacitor and a second capacitor connected to said first and second contacts and connected between the signal receiver and the first and second speech lines respectively.

* * * * *